Figure 1:
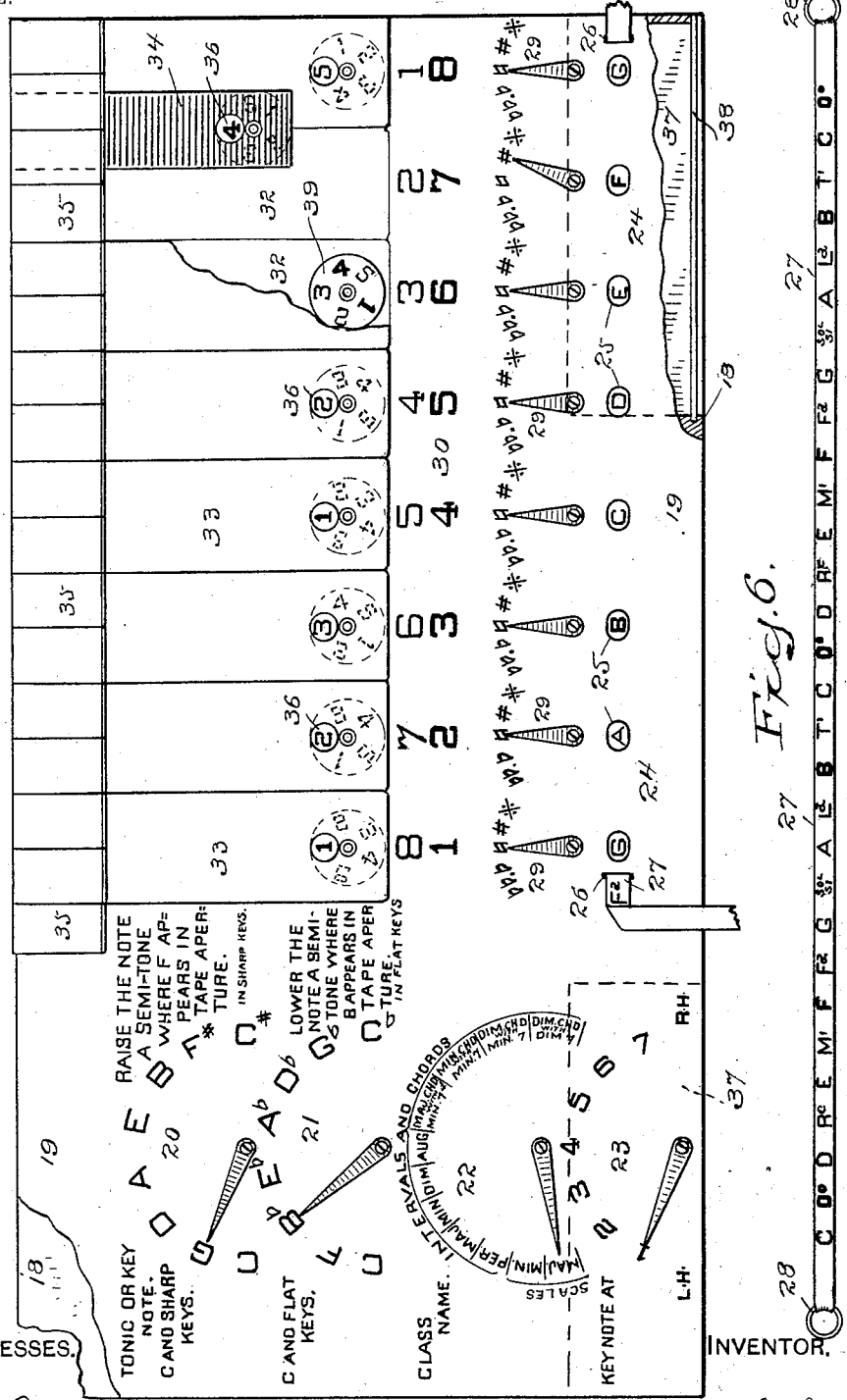

No. 727,846. PATENTED MAY 12, 1903.
E. L. SANFORD.
SCALE AND CHORD INDICATOR.
APPLICATION FILED MAR. 5, 1903.
NO MODEL. 2 SHEETS—SHEET 2.
Fig. 2.
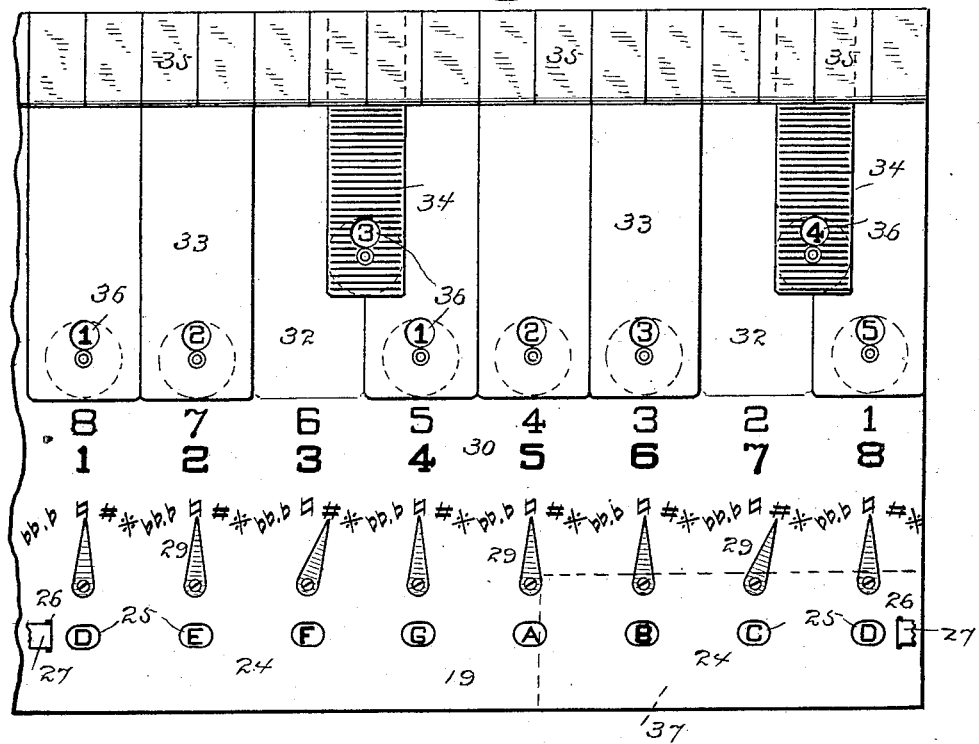
Fig. 3.
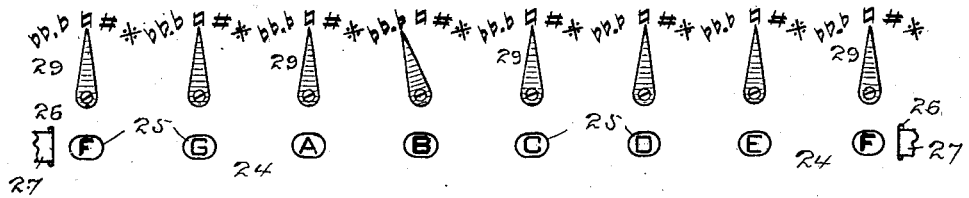
Fig. 4.
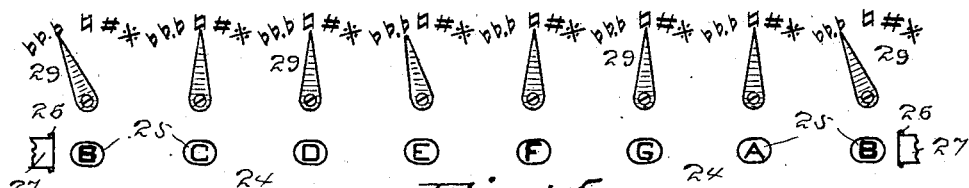
Fig. 5.
WITNESSES. INVENTOR.
H. A. Lamb. Edelbert L. Sanford
S. W. Atherton. By J. A. Wooster
Atty.

No. 727,846. Patented May 12, 1903.

UNITED STATES PATENT OFFICE.

EDELBERT L. SANFORD, OF ROXBURY, CONNECTICUT.

SCALE AND CHORD INDICATOR.

SPECIFICATION forming part of Letters Patent No. 727,846, dated May 12, 1903.

Application filed March 5, 1903. Serial No. 146,339. (No model.)

*To all whom it may concern:*

Be it known that I, EDELBERT L. SANFORD, a citizen of the United States, residing at Roxbury, county of Litchfield, State of Connecticut, have invented a new and useful Scale and Chord Indicator, of which the following is a specification.

It is one of the objects of this invention to provide a simple and accurate scale and chord indicator which will present a keyboard-picture that is a duplicate within the compass of an octave of the keys of a piano or organ finger-board that are actually used in playing different scales, intervals, and chords and will also indicate the fingering to be used in executing them, thereby avoiding the difficulty which beginners find in learning from the keyboard, owing to the presence of the unused keys.
A further object of the invention is to provide a simple and accurate means for indicating by letter, syllable, and numeral the names given to the various notes of the scales, intervals, and chords or the keys of a keyboard.

With these and other objects in view the invention consists in certain parts, improvements, and combinations, which will be hereinafter described and then specifically pointed out in the claims hereunto appended.

In the accompanying drawings, forming part of this specification, Figure 1 is a plan view, some parts being broken away, of my novel keyboard-indicator complete, the key-note indicator for sharp-keys being set at the key of G and the key-slips being set to give a keyboard-picture of the keys used in playing the scale of G—that is, the scale of the key of one sharp—and also the fingering of said scale, the sliding strip being set to indicate the letter names of the notes and keys and the order in which they are played and the corresponding sign-index being set to indicate which note is sharped; Fig. 2, a partial plan view of my novel keyboard-indicator, key-slips being set to give a keyboard-picture of the keys used in playing the scale of D—that is, the scale of the key of two sharps—and also the fingering of said scale, the sliding strip being set to indicate the letter names of the notes and keys and the order in which they are played and corresponding sign-indexes being set to indicate which notes are sharped; Fig. 3, a detail plan view showing
the sliding strip set to indicate the letter names of the notes and keys and the order in which they are played of the scale of the key of F—that is, the key of one flat—and the corresponding sign-index being set to indicate which note is flatted; Fig. 4, a similar view showing the sliding strip set to indicate the letter names of the notes of keys and the order in which they are played of the key of B-flat—that is, the key of two flats—and the corresponding sign-indexes being set to indicate which notes are flatted; Fig. 5, a detail plan view showing the letter and syllable indicator and the sign-indexes set to indicate the letter names of the notes and keys of the chord of C in the first position, and Fig. 6 is a view of the letter and syllable strip detached.

The device as a whole comprises a body 18, which may be made of wood, pasteboard, or metal, and a top plate 19, which may be made of cardboard or metal and is securely attached to the body at the edges, but not throughout its entire surface, so as to leave space for the letter and syllable strip to slide freely.

20 denotes the tonic or key-note index for sharp-keys, the same comprising the letters indicating the natural and sharp keys arranged in proper sequence in the form of an arc of a circle, extending from C (the natural-key note) on the left to C-sharp on the right, and a pointer adapted to be set at either of the letters to indicate the key-note for any desired sharp-key.

21 denotes the tonic or key-note index for flat-keys, the same comprising the letters indicating the natural and flat keys arranged in proper sequence in the form of an arc of a circle, extending from C (the natural-key note) on the left to C-flat on the right, and a pointer adapted to be set at either of the letters to indicate the key-note for any desired flat-key, the natural-key note being included for convenience in both indexes.

22 denotes a scale, interval, and chord naming index, the same comprising the names of scales, intervals, and chords arranged in the form of an arc of a circle, extending from abbreviations "maj." and "min.," indicating class names of the scales, to abbreviation of diminished chord with diminished seventh on the right, and a pointer adapted to be set at either of the names.

23 denotes a key-note-locating index which is used in connection with the letter and syllable indicator, presently to be described, to point out the key-note of the key of C and succeeding transpositions of any given scale, interval, or chord corresponding to either of the key-note indexes. This index consists of the numerals "1" to "7," inclusive, arranged in an arc of a circle, and a pointer adapted to be set at either of the numerals. The letters "L. H." (left hand) and "R. H." (right hand) may be added to show which hand is required to play any given scale, interval, or chord as arranged on the keyboard-indicator, presently to be described, the pointer of the key-note-locating index being used to indicate the hand required.

24 denotes a letter and syllable indicator, which comprises a series of eight apertures in the top plate, (specifically indicated by 25,) slots 26 at the respective ends of the series of apertures, and a movable letter and syllable strip 27, lying under the apertures and its ends extending through the slots. Rings 28 are placed at the ends of strip 27 for convenience in manipulation and to prevent either end of the strip from being drawn through the corresponding slot. Letter and syllable strip 27 bears upon its face two octaves of the letter names of notes spaced to correspond with apertures 25, said two octaves beginning and ending with "C," and intermediate said letter names the syllable names of two octaves beginning and ending with "Do." In practice the letters "F" and "B" on strip 27 and the syllable "Do" are preferably in red, the other letters and syllables being in black. This is for convenience in making transpositions, the letter "F" indicating the changes in the sharp-keys and the letter "B" in the flat-keys. I have indicated this in Fig. 6 by making the letters "F" and "B" and the syllable "Do" heavier than the other letters and syllables. As the letter names and syllable names are both spaced to correspond with the apertures in the top plate, it is obvious that only a desired sequence of letter names or syllable names will be exposed at the apertures—that is to say, when it is desired to expose a scale of syllable names all the letter names and all except the desired syllable names will be covered by the top plate.

Above the apertures 25 of the letter and syllable indicator and corresponding with said apertures I provide a series of sign-indexes, each of which is specifically indicated by 29 and each comprising the sign characters double flat, flat, natural, sharp, and double sharp arranged in an arc of a circle and a pointer adapted to register with either of the signs. These indexes may be used to designate the proper signs to be used in connection with the letter names or syllable names appearing at the apertures of the letter and syllable indicator. In indicating intervals or chords, as in Fig. 5, the pointers may be swung around to cover the names of notes appearing at the apertures, but which are not used in the desired chord.

30 denotes a numeral note-naming indicator comprising two series of numerals extending in reverse directions from "1" to "8." One series, made larger than the other, is used to indicate the numeral names of the notes of a scale or the apertures in the letter and syllable indicator used to designate the notes in ascending order—that is, from left to right. The smaller series of numerals is used to indicate the numeral names of the notes of a scale or the apertures in the letter and syllable indicator used to designate the notes in descending order—that is, from right to left.

31 denotes a keyboard-indicator as a whole, which is used to give a duplicate of the keyboard-keys used in playing any given scale, interval, or chord on the keyboard of a piano or organ, the same comprising a series of eight rectangular spaces 32, bounded by lines upon the top plate which I term "key-slip sections," the eight sections comprising the compass of an octave, a plurality of white key-slips, (indicated by 33,) preferably corresponding in size and shape with the white notes of a keyboard, a plurality of shorter and narrower black key-slips 34, preferably corresponding in shape and size with the black notes of a keyboard, and a series of key-slip springs, (indicated by 35.) For convenience in placing the black key-slips, as in Fig. 2, I ordinarily provide two key-slip springs for each key-slip section. An additional key-slip spring may be provided at the left to secure a white key-slip when the letter name C-flat occurs below the first key-slip section, thereby slightly extending the natural limitations of the combined key-slip sections in general use. The springs may be simply flat pieces of spring metal slightly upturned at the lower ends and adapted to bear upon the key-slips. The key-slips may be made respectively of white and black celluloid or cardboard. Each key-slip is provided with an aperture 36 and has riveted or eyeleted to its under side a rotatable disk 39, having numerals from "1" to "5," which are adapted to be exposed at the apertures. These numerals correspond with the fingers, and the numerals exposed at the apertures in a series of key-slips affixed in place indicate the fingering of the scale, interval, or chord it may be desired to play on a keyboard. The numerals "1" and "4" are in practice preferably in red, as they mark important points in fingering scales and chords the other numerals being in black. In the drawings I have shown the numerals "1" and "4," which in practice are red, as made heavier. In practice I provide recesses or pockets 37 in the body to receive the key-slips when not in use, separate pockets being provided for the white and black key-slips. In the present instance I have shown the pockets as closed by sliding covers 38.

The operation of my novel indicator is as follows: Taking, for example, the scale of G—that is, the scale of one sharp, as in Fig. 1—turn the pointer of sharp-key-note index 20 to the letter "G;" turn the pointer of scale and chord naming index 22 to the term "major scale;" turn the pointer of key-note-locating index 23 to the numeral "1," which indicates that the first letter appearing at the left in letter and syllable indicator 24 is the key-note; draw letter and syllable strip 27 in either direction as may be required to make letters appear at the apertures to correspond with the indications of key-note index 20 and key-note-locating index 23—that is, so that the letter "G" will appear at the first aperture at the left; turn all the pointers of sign-indexes 29 to the natural-sign except the pointer corresponding to the letter "F" appearing at one of the apertures which is turned to the sharp-sign, indicating that the letter "F" only is sharped; place white key-slips 33 in each of the key-slip sections except the section corresponding to the letter "F" in the letter and syllable indicator, which is left vacant, and place a black key-slip 34 partly over the vacant key-slip section and partly over the white key-slip corresponding to G in the letter and syllable indicator, said key-slips being held in place by simply sliding their upper ends under corresponding key-slip springs 35.

The fingering of the scale of G upon the keyboard is indicated as follows, (see Fig. 1:) Commencing at the left, turn the disk of the first white key-slip to place the numeral "1" at the aperture; turn the disk of the second white key-slip to place the numeral "2" at the aperture; turn the third to present the numeral "3" at the aperture; turn the fourth to present the numeral "1" at the aperture; turn the fifth to present the numeral "2" at the aperture; turn the sixth to present the numeral "3" at the aperture; turn the seventh, which is a black key-slip, to place the numeral "4" at the aperture, and turn the eighth, which is a white key-slip, to place the numeral "5" at the aperture. It will be noted as adding much to the convenience in use that the apertures of letter and syllable indicator 24, the pivotal points of the pointers in sign-indexes 29, the numerals of note-naming indicator 30, and the mid-width of the key-slip sections all register with each other, so that any two or more of these features of the device that may be used simultaneously may be read in connection with each other.

By proceeding as above described and as illustrated in Fig. 1, with the exception of key-note index for flat-keys 21, the performer has before him full directions for setting up and for playing the scale of G—that is, the scale of one sharp. Key-note indicator 20 indicates the key-note of the scale. Scale, interval, and chord naming index 22 in connection with key-note index 20 indicates the correct name of the scale, as G major. Key-note-locating index 23 indicates that the key-note is at the first aperture at the left in letter and syllable indicator 24, which in turn indicates the correct reading of the notes of that scale, as G-natural, A-natural, B-natural, C-natural, D-natural, E-natural, F-sharp, and G-natural. The sign-indexes 29 indicate the sign of each note as played as all natural except F, which is sharped. The larger numerals of numeral note-naming indicator 30 indicate the corresponding numeral names of the notes in ascending order, and keyboard-indicator 31, the key-slips of which are placed in accordance with the reading of the letter and syllable indicator, gives a complete keyboard-picture of the scale as played and also indicates the correct fingering in playing it.

In Fig. 2 I have shown letter and syllable indicator 24, the sign-indexes 29, and keyboard-indicator 31 as set to indicate the mode of playing the scale of D—that is, the scale of two sharps—the key-note "D" appearing at the first aperture at the left and "F" and "C" being indicated as sharped, the sharping of both F and C being accomplished by the use of black notes on the keyboard and the use of black key-slips in the keyboard-indicator. For this scale the pointer of key-note index 20 would be set at "D," the pointers of scale, interval, and chord naming index 22 and key-note-locating index 23 remaining as before.

In Fig. 3 I have shown letter and syllable indicator 24 and sign-indexes 29 as set for the key of F—that is, the key of one flat—the letter "F" appearing at the left-hand aperture and the pointer corresponding with "B" as it appears at an aperture being set at the sign one flat.

In Fig. 1 I have shown the pointer of key-note index for flat-keys 21 as set to indicate the key of two flats—that is, the key of B-flat—and in Fig. 4 have shown letter and syllable indicator 24 and sign-indexes 29 as set for the key of two flats, the letter "B" appearing at the left-hand aperture and the pointers corresponding to "B" and "E" being set at the flat-sign.

By sliding letter and syllable strip 27 until the syllable "Do" appears at a key-note aperture—for example, the left-hand aperture—the syllabic names of the notes of the major scale are indicated at the apertures of the letter and syllable indicator. From the description above given the other transpositions required in setting up natural, sharp, and flat scales will be obvious.

As all intervals and chords are derived from the notes of the scale, it is obvious that by sliding letter and syllable strip 27 so as to cause the key-note to appear at one of the apertures and then covering the apertures in letter and syllable indicator 24 that are not required with the pointers of sign-indexes 29 the correct reading of any desired interval or chord within the compass of an octave may be given.

In Fig. 5 I have shown letter and syllable indicator 24 and sign-indexes 29 as set to indicate the letter names of the notes and keys of the chord of C in the first position. The letters "C," "E," and "G" appear at apertures, the other apertures being covered by the pointers of the sign-indexes. The second position of the chord of C—that is, "E G C"—may be indicated by causing the key-note C to appear at the sixth aperture and using the first, third, and sixth apertures, covering the others. The third position of this chord—that is, "G C E"—may be indicated by causing the key-note C to appear at the fourth aperture and using the first, fourth, and sixth apertures, covering the others with the pointers.

Having thus described my invention, I claim—

1. A device of the character described comprising key-note indexes for sharp and flat keys each consisting of a series of letters indicating respectively the natural and sharp keys and the natural and flat keys arranged in an arc of a circle and a pointer, a letter and syllable indicator consisting of a series of apertures and a movable letter and syllable strip lying under said apertures and having upon its face two octaves of the letter names of notes, spaced to correspond with the apertures, and intermediate said letter names the syllable names of notes, a series of corresponding sign-indexes each consisting of the sign characters arranged in an arc of a circle and a pointer, and a keyboard-indicator consisting of a series of key-slip sections, a plurality of black and white key-slips corresponding with the notes of a keyboard and key-slip springs whereby the key-slips are retained in place.

2. The letter and syllable indicator 24 consisting of a plate having a series of apertures and slots at the respective ends of the series of apertures and a movable letter and syllable strip lying under the apertures with its ends extending through the slots and having upon its face the letter names of notes, spaced to correspond with the apertures, and intermediate said letter names the syllable names of notes, substantially as shown, for the purpose specified.

3. The keyboard-indicator 31 consisting of a series of key-slip sections, a plurality of black and white key-slips corresponding with the notes of the keyboard and key-slip springs whereby the key-slips are retained in place.

4. The keyboard-indicator 31 consisting of a series of key-slip sections, a plurality of black and white key-slips corresponding with the notes of a keyboard, each key-slip having an aperture, and a rotatable disk with finger-numerals either of which is adapted to be exposed at the aperture to indicate the fingering and key-slip springs whereby the key-slips are retained in place.

5. In a device of the character described the combination with a letter and syllable indicator consisting of a plate having a series of apertures and slots at the ends of the apertures and a movable letter and syllable strip lying under the apertures with its ends extending through the slots and having upon its face the letter names of notes, spaced to correspond with the apertures, and intermediate said letter names the syllable names of notes and a series of sign-indexes each consisting of a series of sign characters arranged in an arc of a circle and a pointer adapted to register with either of the characters or to cover the corresponding aperture in the letter and syllable indicator in the setting up of chords.

6. A device of the character described comprising key-note indexes consisting of series of letters indicating the natural and sharp and flat keys and a pointer, a letter and syllable indicator consisting of a series of apertures and a movable letter and syllable strip lying under the apertures and having upon its face the letter and syllable names of notes spaced to correspond with the apertures, a series of corresponding sign-indexes consisting of sets of sign characters and pointers and a keyboard-indicator consisting of a series of key-slip sections, a plurality of black and white key-slips corresponding with the notes of a keyboard and springs for retaining the slips in place, each key-slip being provided with an aperture and a rotatable disk having finger-numerals either of which is adapted to be exposed at the aperture.

7. In a device of the character described the combination with a letter and syllable indicator consisting of a series of apertures and a movable letter and syllable strip lying under the apertures and having upon its face the letter and syllable names of notes spaced to correspond with the apertures and a series of corresponding sign-indexes consisting of sets of sign characters and pointers, of a keyboard-indicator comprising a plurality of black and white key-slips corresponding with the notes of a keyboard and springs for retaining the slips in place.

8. In a device of the character described the combination with a letter and syllable indicator consisting of a series of apertures and a movable letter and syllable strip lying under the apertures and having upon its face the letter and syllable names of notes spaced to correspond with the apertures and a series of corresponding sign-indexes consisting of sets of sign characters and pointers, of a keyboard-indicator consisting of black and white key-slips corresponding with the notes of a keyboard, each key-slip being provided with an aperture, and a rotatable disk having finger-numerals adapted to register with the aperture, and springs whereby the key-slips are retained in place in setting up a scale, interval or chord.

In testimony whereof I affix my signature in presence of two witnesses.

EDELBERT L. SANFORD.

Witnesses:
 ELISABETH J. PONS,
 STELLA E. CLARK.